US007923117B2

(12) United States Patent
Chon

(10) Patent No.: US 7,923,117 B2
(45) Date of Patent: Apr. 12, 2011

(54) POLYMER FOR AN INK RECEIVING LAYER OF AN INKJET RECORDING ELEMENT

(75) Inventor: Tienteh Chon, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1029 days.

(21) Appl. No.: 11/626,906

(22) Filed: Jan. 25, 2007

(65) Prior Publication Data

US 2008/0182936 A1 Jul. 31, 2008

(51) Int. Cl.
*B32B 9/04* (2006.01)

(52) U.S. Cl. ........ 428/446; 428/447; 428/449; 428/451; 428/452; 428/500; 428/508; 428/511; 428/514

(58) Field of Classification Search .................. 428/446, 428/447, 449, 451, 452, 500, 508, 511, 514
See application file for complete search history.

(56) References Cited

U.S. PATENT DOCUMENTS

| | | | |
|---|---|---|---|
| 5,498,505 | A | 3/1996 | Tsukahara et al. |
| 6,228,475 | B1 | 5/2001 | Chu et al. |
| 6,465,078 | B1 | 10/2002 | Kawai et al. |
| 6,645,582 | B2 | 11/2003 | Sadasivan et al. |
| 6,743,850 | B2 | 6/2004 | Yoshimura et al. |
| 6,884,479 | B2 | 4/2005 | Chu et al. |
| 6,919,109 | B2 | 7/2005 | Nakano et al. |
| 7,059,715 | B2 | 6/2006 | Taguchi et al. |
| 7,070,840 | B2 | 7/2006 | Yamada et al. |
| 7,086,726 | B2 | 8/2006 | Takashima et al. |
| 2003/0186003 | A1 | 10/2003 | Nakano et al. |
| 2005/0003114 | A1 | 1/2005 | Nakano et al. |
| 2006/0003112 | A1 | 1/2006 | DeMejo et al. |
| 2006/0181587 | A1 | 8/2006 | Bauer et al. |

FOREIGN PATENT DOCUMENTS

| | | |
|---|---|---|
| JP | 2001010202 | 1/2001 |
| JP | 2003-305944 | * 10/2003 |
| JP | 2004-216703 | * 8/2004 |

* cited by examiner

*Primary Examiner* — Bernard Lipman

(57) ABSTRACT

A polymer for an ink receiving layer of an inkjet recording element includes at least one first monomer chemically bonded to at least one second monomer. The second monomer includes a silane functional group. The at least one second monomer is distributed along a carbon backbone of the polymer at a non-terminal end. The polymer is capable of chemically bonding with an inorganic particulate substance.

13 Claims, No Drawings

POLYMER FOR AN INK RECEIVING LAYER OF AN INKJET RECORDING ELEMENT

BACKGROUND

This disclosure relates generally to polymers for ink receiving layers of inkjet recording elements and methods for making the same.

Inkjet photo imaging is a non-impact method of producing images on a print medium or recording element, such as paper. Some print mediums may include a substrate having a porous ink receiving layer disposed on one or both sides. Such porous ink receiving layers may include porous inorganic particulates bound together by a polymeric binder. These porous ink receiving layers may also include a mordant polymer. The mordant polymer is generally ionic, and is attracted to an oppositely charged species of an ink when the ink is applied to the print medium. The ink is thereby fixed to the surface of the print medium.

Enhancements in print characteristics, such as, for example, water fastness, water and fade resistance, ink migration, bleeding control, colorshift, glossiness, bronzing, as well as overall print quality, may be achieved by improving ink-adsorption or fixation with the print medium. Although many suitable mordant polymers are currently available for use with ink receiving layers, such mordant polymers may, in some instances, be unable to substantially prevent dye from migrating.

DETAILED DESCRIPTION

Embodiments of the polymer disclosed herein are advantageously suitable for forming an ink receiving layer of an inkjet recording element or print medium. The polymer(s) is a cationic mordant polymer that contains functional groups that are able to react with the surface of inorganic particulates present in or on a porous medium. The polymer(s) disclosed herein advantageously enhances print characteristics, such as water fastness, water resistance, bleeding control and colorshift in humid conditions, glossiness and lower bronzing effect. Embodiments of the polymer may also advantageously be produced using a relatively simple and cost-effective copolymerization synthesis. The polymer is also compatible with both dye and pigment-based inks.

Generally, the polymer includes at least one first monomer chemically bonded to at least one second monomer having a silane functional group. The second monomer is distributed along the polymer backbone at a non-terminal end.

In an embodiment, the first monomer of the polymer includes at least one amine functional group. The first monomer may be a primary amine ($—NH_2$), a secondary amine ($—NHR_1$), a tertiary amine ($—NR_1R_2$), or a quaternary amine ($—NR_1R_2R_3^+$). In an embodiment, the first monomer may be represented by formula (1):

(1)

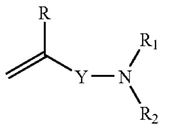

wherein: "R" is a hydrogen, a methyl group or an ethyl group; "Y" is a linking group including from 1 to 15 carbon atoms (non-limiting examples of which include linear or branched hydrocarbons, aromatics, alkylaromatics, esters, amides, carbonates, carbonyls, ethers and/or the combination thereof); and $R_1$ and $R_2$ are each selected from hydrogen, organic group(s) including from 1 to 10 carbon atoms (non-limiting examples of which include linear or branched hydrocarbons, aromatics, alkylaromatics, and/or combinations thereof), and/or combinations thereof.

In another embodiment, the first monomer may be represented by formula (2):

(2)

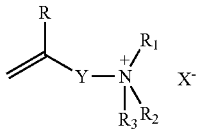

wherein: "R" is a hydrogen, a methyl group or an ethyl group; "Y" is a linking group including from 1 to 15 carbon atoms, where the linking group may be a linear or branched hydrocarbon, an aromatic, an alkylaromatic, an ester, an amide, a carbonate, a carbonyl, an ether, and/or combinations thereof; and $R_1$, $R_2$ and $R_3$ are each selected from hydrogen, organic group(s) containing 1 to 10 carbon atoms, or combinations thereof. Non-limiting examples of the organic group(s) suitable for $R_1$, $R_2$ and/or $R_3$ include linear or branched hydrocarbons, aromatics, alkylaromatics, and/or combinations thereof. $X^-$ is a counter ion, non-limitative examples of which include halogens (such as chlorine, bromine, and/or fluorine), methylsulfonate, methylsulfate, hydrogen sulfate, hydrogen sulfite, triflate, acetate, propionate, formate, and/or combinations thereof.

Non-limiting examples of suitable amine monomers for the first monomer include aminoethylmethacrylate; aminoethylacrylate; 2,2-dimethylaminoethylmethacrylate; 2,2-diethylaminoethylmethacrylate; 2-(t-butylamino)ethylmethacrylate; 2-methylaminoethylmethacrylate; 2-(ethylamino)ethylmethacrylate; 2-propylaminoethylmethacrylate; 2-(t-butylamino)ethylacrylamide; aminoethylacrylamide; aminoethylmethacrylamide; methylaminoethylmethacrylate; trimethylaminoethylmethacrylate chloride salt (quat); 2-vinyl-imidazole; (vinylbenzyl)trimethylammonium chloride; (vinylbenzyl)triethylammonium chloride; and diallyldimethylammonium chloride salt.

The second monomer of the polymer includes a carbon backbone having at least one silane functional group distributed thereon. The second monomer may be represented by formula (3):

(3)

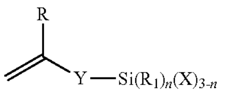

wherein: "n" is an integer from 0 to 2; "R" is a hydrogen, a methyl group or an ethyl group; "$R_1$" is selected from hydrogen, organic group(s) containing 1 to 10 carbon atoms, or combinations thereof; "Y" is a linking group including from 1 to 15 carbon atoms, and may be a linear or branched hydrocarbon, an aromatic, an alkylaromatic, an ester, an amide, a carbonate, a carbonyl, an ether, and/or combinations thereof; and X is a halogen (e.g., chlorine, bromine, or fluorine), a hydroxy group, an alkoxy group, and/or combinations thereof. In an embodiment, both $R_1$ and X are attached directly to the silicon atom.

Non-limiting examples of the second monomer (having the structure shown in formula 3) include:

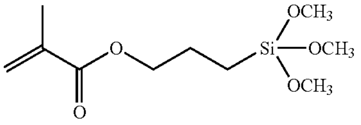

Second monomer, Example 1

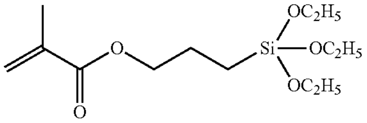

Second monomer, Example 2

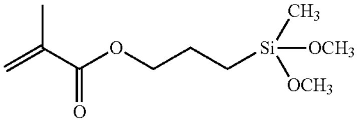

Second monomer, Example 3

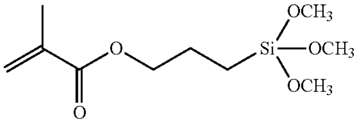

Second monomer, Example 4

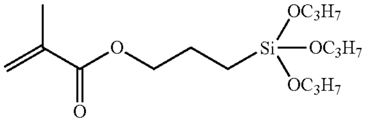

Second monomer, Example 5

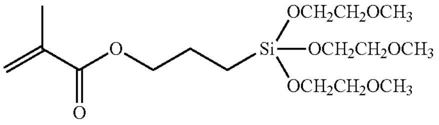

Second monomer, Example 6

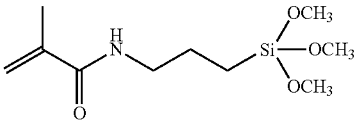

Second monomer, Example 7

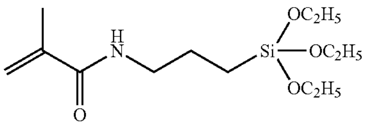

Second monomer, Example 8

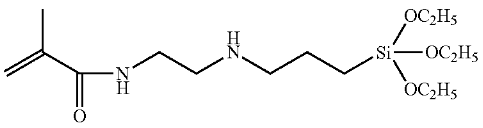

Second monomer, Example 9

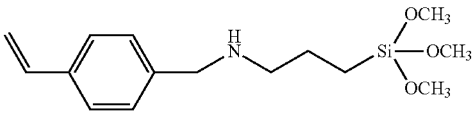

Second monomer, Example 10

-continued

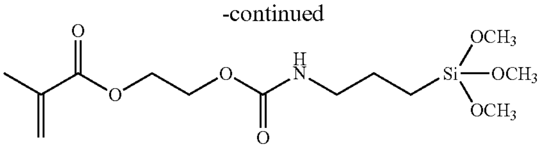

Second monomer, Example 11

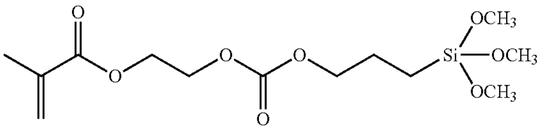

Second monomer, Example 12

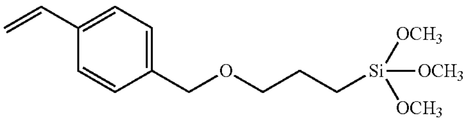

Second monomer, Example 13

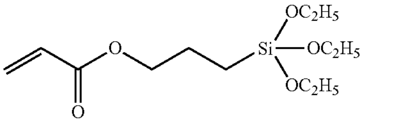

Second monomer, Example 14

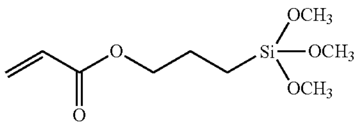

Second monomer, Example 15

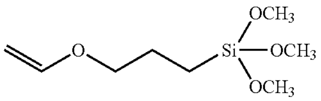

Second monomer, Example 16

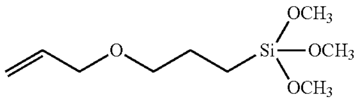

Second monomer, Example 17

In an embodiment, at least two second monomers are included per polymer chain. As such, this embodiment of the polymer includes at least two silane functional groups. At least one of the second monomers is located along the polymer carbon backbone at a non-terminal end position (i.e., the silane functional group is not located at the terminal end of the polymer backbone). The other of the second monomers may be located at the terminal end position. In another embodiment, both of the second monomers are located along the polymer carbon backbone at non-terminal end positions (i.e., the silane functional groups of each of the monomers are not located at the terminal ends of the polymer backbone).

The percentage of the silane functional groups in the polymer may advantageously be adjusted for a desirable application. A higher percentage of silane functional groups may be incorporated into the polymers disclosed herein because of the distribution along the polymer backbone, as opposed to silane functional groups included at the terminal end(s) alone. Without being bound to any theory, it is believed that the yield of reaction between the inorganic particulate substance and the polymer is improved, at least in part, because of the higher percentage of silane functional groups.

Embodiments of the polymer may include a third (e.g., diluent) monomer. These additional monomers may be added to modify the physical properties of the polymer(s). Example of the third monomers include, but are not limited to, $C_1$-$C_{12}$ alkyl acrylates and/or $C_1$-$C_{12}$ methacrylates (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate, and/or the like, and/or combinations thereof); aromatic monomers (e.g., styrene, phenyl methacrylate, o-tolyl methacrylate, m-tolyl methacrylate, p-tolyl methacrylate, benzyl methacrylate, and/or the like, and/or combinations thereof); hydroxyl containing monomers (e.g., hydroxyethylacrylate, hydroxyethylmethacrylate, and/or the like, and/or combinations thereof); carboxylic containing monomers (e.g., acrylic acid, methacrylic acid, and/or the like, and/or combinations thereof); vinyl ester monomers (e.g., vinyl acetate, vinyl propionate, vinylbenzoate, vinylpivalate, vinyl-2-ethylhexanoate, vinylversatate, and/or the like, and/or combinations thereof); $C_1$-$C_{12}$ alkyl acrylamides and/or $C_1$-$C_{12}$ methacrylamide (e.g., t-butyl acrylamide, sec-butyl acrylamide, N,N-dimethylacrylamide, and/or the like, and/or combinations thereof); crosslinking monomers (e.g., divinyl benzene, ethyleneglycoldimethacrylate, bis(acryloylamido)methylene, and/or the like, and/or combinations thereof); and/or combinations thereof. In some embodiments, the third monomer is selected from alkyl acrylate, alkyl methacrylate, vinyl esters, and styrene derivatives.

Embodiments of the polymer disclosed herein have a weight average molecular weight ranging from about 500 to about 1,000,000. It is to be understood that the weight average molecular weight may be measured with gel permeation chromatography.

Embodiments of the polymer disclosed herein also have a total weight percent equaling 100. Some embodiments of the polymer includes from about 10 wt % to about 95 wt % of the first monomer, and from about 0.1 wt % to about 10 wt % of the second monomer. Other embodiments of the polymer include from about 10 wt % to about 95 wt % of the first monomer, from about 0.1 wt % to about 20 wt % of the second monomer, and from about 0 wt % to about 90 wt % of the third monomer. Still other embodiments of the polymer include the first monomer in an amount ranging from about 50 wt % to about 95 wt %, the second monomer in an amount ranging from about 0.5 wt % to about 10 wt %, and the third monomer in an amount ranging from about 5 wt % to about 50 wt %.

The following structures are non-limiting examples of embodiments of the polymer, where the weight percents of the first monomer (represented by formula (1) and (2)), the second monomer (represented by formula (3)), and the third (diluent) monomer are within the ranges outlined herein. As previously described, any combination of weight percents may be used as long as the total weight percent of the monomers in the polymer equals 100%. Non-limitative examples of the polymer include:

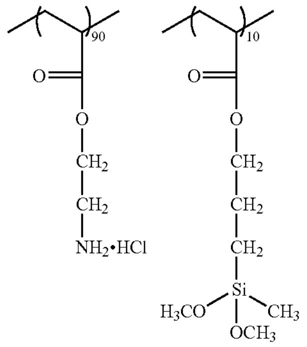

Polymer, Example 1

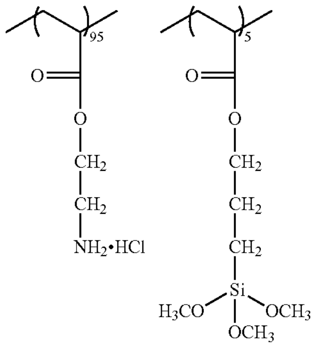

Polymer, Example 2

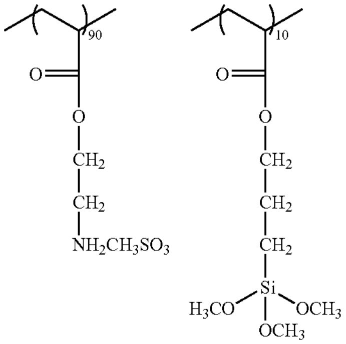

Polymer, Example 3

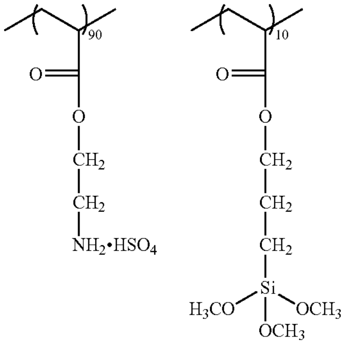

Polymer, Example 4

-continued
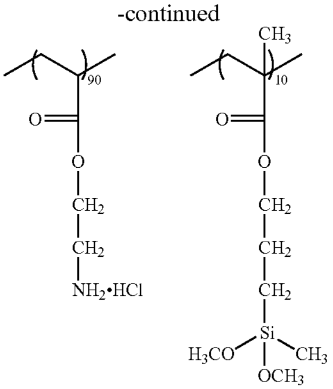
Polymer, Example 5
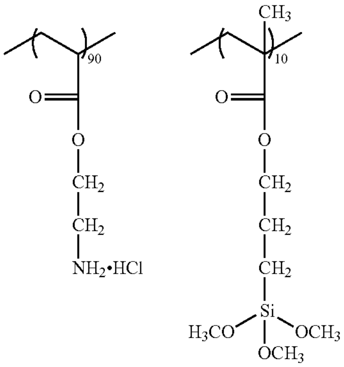
Polymer, Example 6
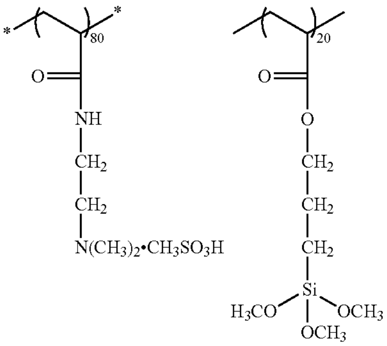
Polymer, Example 7
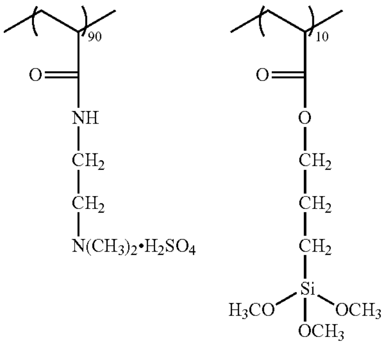
Polymer, Example 8
-continued
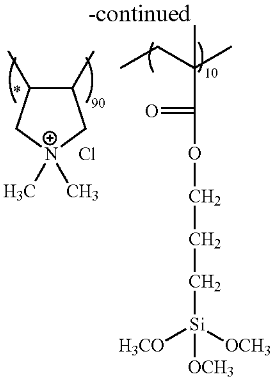
Polymer, Example 9
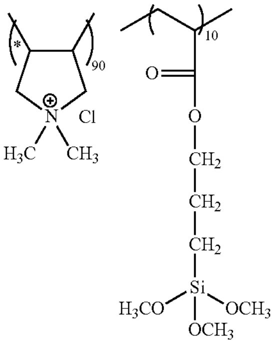
Polymer, Example 10
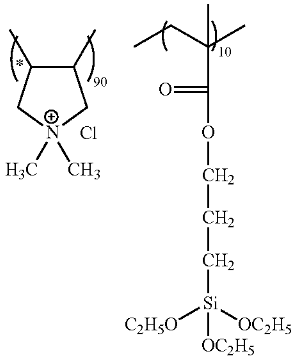
Polymer, Example 11
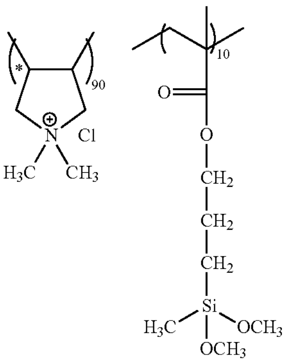
Polymer, Example 12

-continued
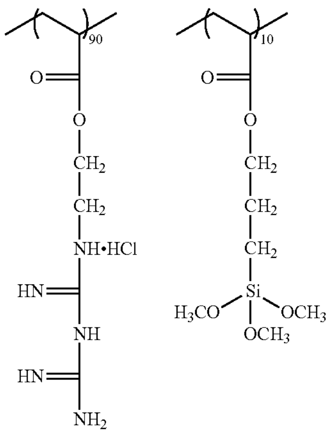
Polymer, Example 13
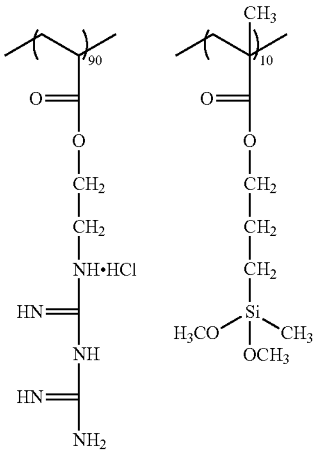
Polymer, Example 14
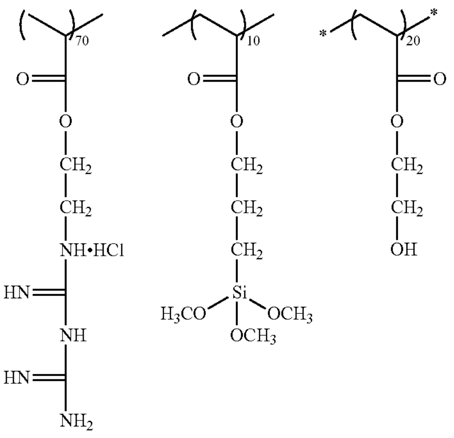
Polymer, Example 15
-continued
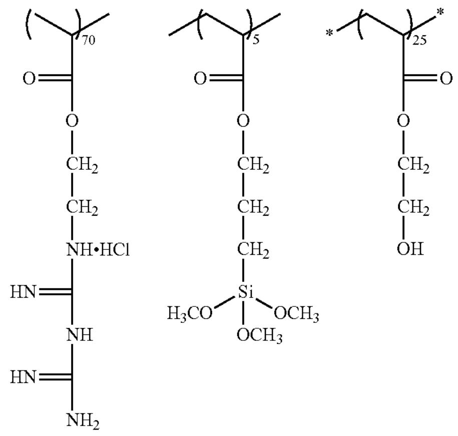
Polymer, Example 16
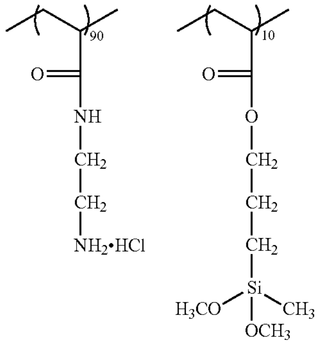
Polymer, Example 17
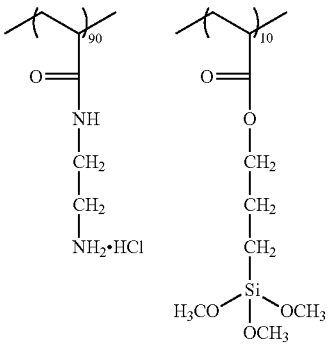
Polymer, Example 18
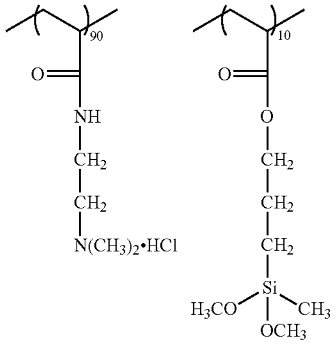
Polymer, Example 19

-continued
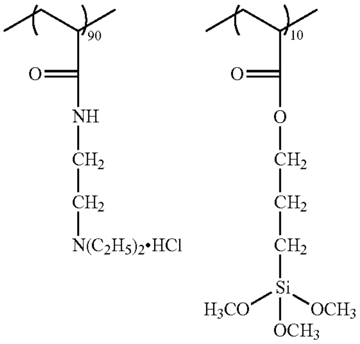
Polymer, Example 20
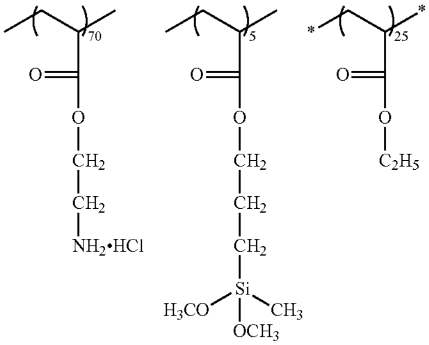
Polymer, Example 21
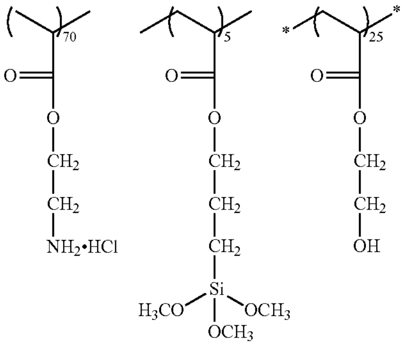
Polymer, Example 22
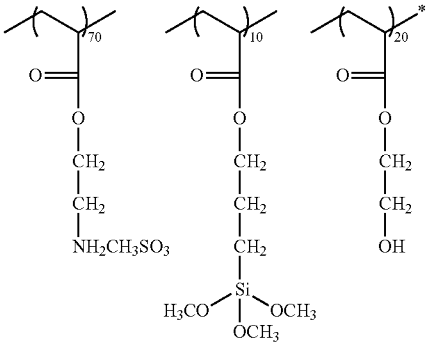
Polymer, Example 23
-continued
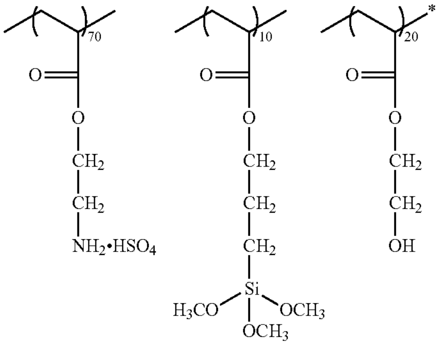
Polymer, Example 24
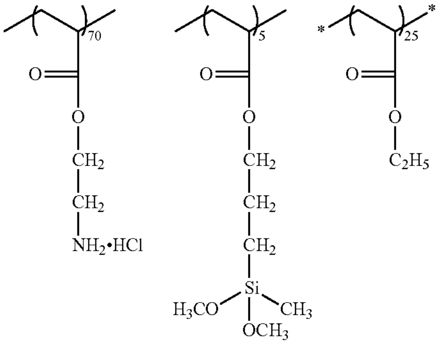
Polymer, Example 25
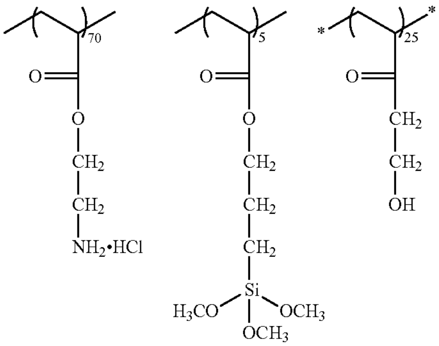
Polymer, Example 26
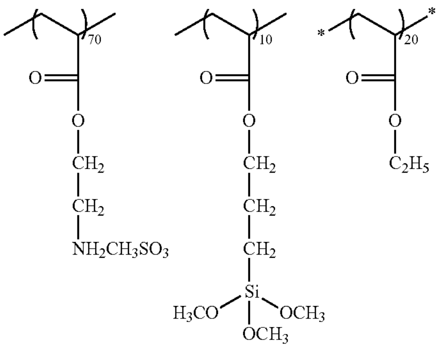
Polymer, Example 27

-continued
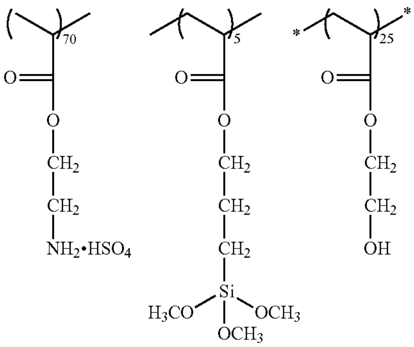
Polymer, Example 28
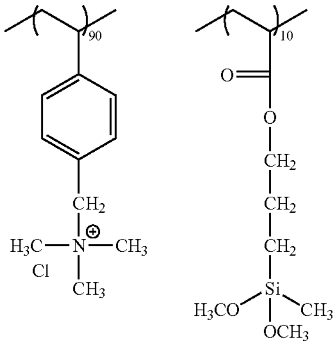
Polymer, Example 29
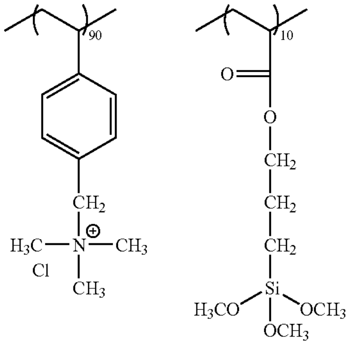
Polymer, Example 30
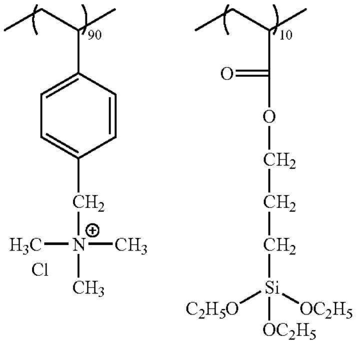
Polymer, Example 31
-continued
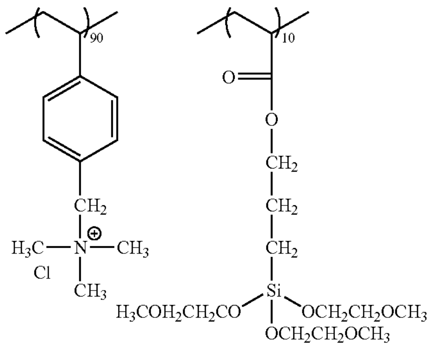
Polymer, Example 32
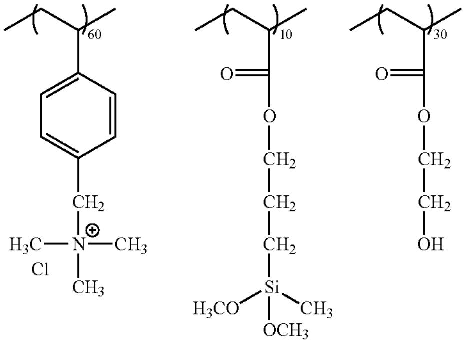
Polymer, Example 33
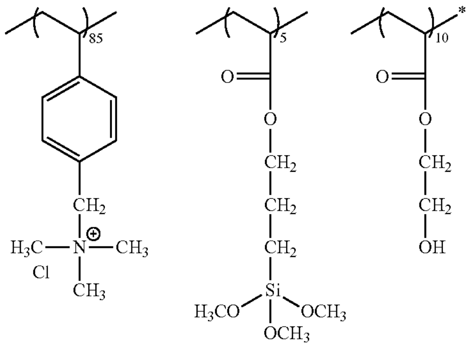
Polymer, Example 34
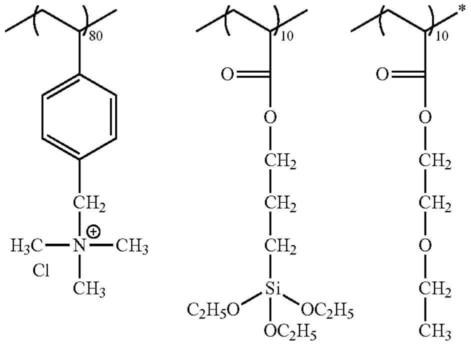
Polymer, Example 35

-continued

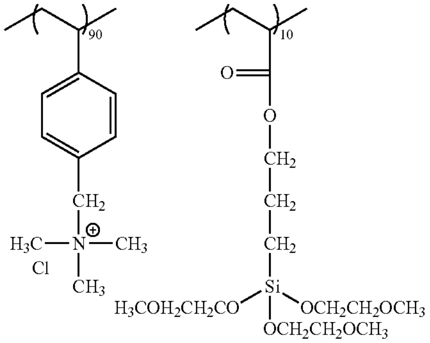

Polymer, Example 36

-continued

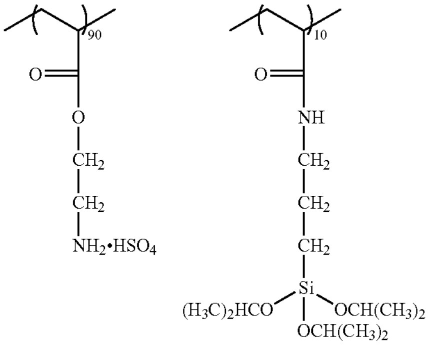

Polymer, Example 40

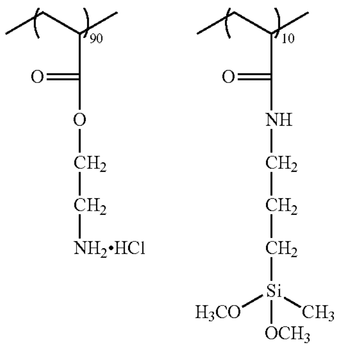

Polymer, Example 37

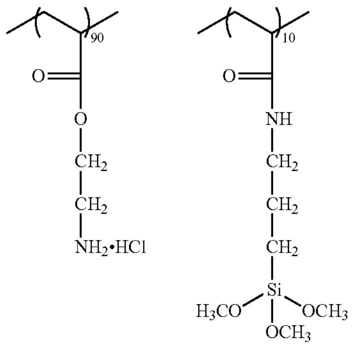

Polymer, Example 38

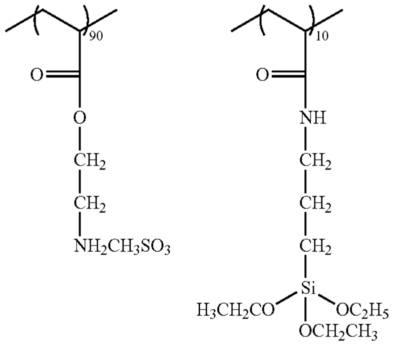

Polymer, Example 39

As depicted in the embodiments shown hereinabove, at least one of the second monomers is located along the polymer backbone at a position other than at the terminal end.

Polymerization of the monomers in any of the embodiments disclosed herein may be achieved by free radical polymerization. Solution polymerization is one non-limiting example of free radical polymerization. The solution may be aqueous, may include organic solvents, or may include a mixture of water and water miscible organic solvents, such as methanol, ethanol, acetone, IPA, n-methylpyrrolidone, dimethylformamide (DMF), or other similar solvents, or combinations thereof. Copolymerization may also be completed in a batch process or may be completed in a continuous or semi-continuous process. In an embodiment, polymerization may be initiated by thermal or reduction/oxidation (i.e., redox) initiators. Non-limiting examples of such initiators include: persulfate (sodium or potassium), persufate-bisulfite, persulfate-metabisulfite, iron(II)-persulfate (Fenton's reagent), AIBN, and water soluble azo initiators, such as, for example 2,2'-Azobis[2-(5-methyl-2-imidazolin-2-yl) propane]dihydrochloride, 2,2'-Azobis[2-(2-imidazolin-2-yl) propane]dihydrochloride, 2,2'-Azobis(2-methylpropionamide)dihydrochloride, 2,2'-Azobis[N-(2-carboxyethyl)-2-methylpropionamidine]tetrahydrate, 2,2'-Azobis{2-methyl-N-[2-(1-hydroxybuthyl)]propionamide, and 2,2'-Azobis[2-methyl-N-(2-hydroxyethyl)propionamide. A detailed description and mechanism of free radical polymerization, type of initiators, and solution polymerization may be found in: *Principles of Polymerization*, George Odian, Wiley-Inter-Science (2004).

The polymer may then be chemically bonded to an inorganic particulate substance. The inorganic particulate substance is a metal oxide or semi-metal oxide material. In an embodiment, the inorganic metal oxide or semi-metal oxide particulates may be silica, fumed silica, silica gel, colloidal silica, alumina, fumed alumina, boehmite, semi-boehmite, silicates (such as aluminum silicate, magnesium silicate, and the like), titania, zirconia, calcium carbonate, clays, and/or combinations thereof. In a non-limiting example embodiment, the oxide particulates may be silica, fumed silica, alumina, fumed alumina. Some embodiments of the metal oxide or the semi-metal oxide have a surface area ranging from about 100 square meters per gram to about 400 square meters per gram by BET measurement.

Without being bound to any theory, it is believed that upon establishing the polymer on a substrate surface (which contains or has established thereon the inorganic particulate substance), the polymer contacts and reacts with the inorganic particulate substance. It is further believed that embodiments of the cationic polymer, through its silane functional or coupling group, reacts with hydroxy groups of the inorganic particulate substance (e.g., metal or semi-metal oxide particles), thereby forming covalent bonds therebetween. This results in fixation of the cationic polymers on the surface of the inorganic particulate substance. It is believed that dye fixation and water resistance of the porous inkjet media improves significantly if the cationic polymer is covalently bonded to the surface of the inorganic particulate substance.

In an embodiment, the inorganic particulate substance is located at a surface of a substrate to be coated with the ink receiving layer. The substrate may be a single or double sided resin coated paper, a cast coated paper, or a calendered coated paper. Non-limiting examples of the resin coated paper include polyethylene or polypropylene extruded photo paper. However, it is to be understood that many different materials may be employed as the substrate, including, but not limited to those made from polymeric materials (non-limitative examples of which include polyester white film or polyester transparent film), metals, and/or mixtures thereof. A non-limitative example of a suitable metal material is a metal in foil form made from, for example, at least one of aluminum, silver, tin, copper, alloys thereof, and/or mixtures thereof.

In some instances, an additional polymeric binder may be added to the ink receiving layer. Exemplary polymeric binders that may be used include polyvinyl alcohols including water-soluble copolymers thereof, e.g., copolymers of polyvinyl alcohol and poly(ethylene oxide) or copolymers of polyvinyl alcohol and polyvinylamine; cationic polyvinyl alcohols; acetoacetylated polyvinyl alcohols; polyvinyl acetates; polyvinyl pyrrolidones including copolymers of polyvinyl pyrrolidone and polyvinyl acetate; modified starches including oxidized and etherified starches; water soluble cellulose derivatives including carboxymethyl cellulose, hydroxyethyl cellulose; polyacrylamide including its derivatives and copolymers; casein; gelatin; soybean protein; silyl-modified polyvinyl alcohol; conjugated diene copolymer latexes including maleic anhydride resin and styrene-butadiene copolymer; acrylic polymer latexes including polymers and copolymers of acrylic and methacrylic acids; vinyl polymer latexes including ethylene-vinyl acetate copolymers; functional group-modified latexes including those obtained by modifying the above-mentioned polymers with monomers containing functional groups (e.g. carboxyl, amino, amido, sulfo, etc.); aqueous binders of thermosetting resins including melamine resins, and urea resin; synthetic resin binders including polymethyl methacrylate, polyurethane resin, polyester resin, amide resin, vinyl chloride-vinyl acetate copolymer, polyvinyl butyral, and alkyl resins. In a non-limiting example embodiment, the binder is selected from poly(vinyl alcohol) and copolymers thereof.

Other optional components that may be present in the porous ink receiving layer include surfactants, biocides, plasticizers, optical brighteners, viscosity modifiers, leveling agents, UV absorbers, hindered amine stabilizers, anti-ozonants, silane coupling agents, and/or other known additives, and/or combinations thereof. It is to be further understood that other ingredients may also be incorporated within the porous ink receiving layer in variable quantities. Examples of such other ingredients include, but are not limited to crosslinking compounds (non-limitative examples include boric acid, borates, dialdehydes (such as, for example, glutaraldehyde, succinic dialdehyde, and/or the like, and/or combinations thereof), methylomelamine, glyoxal, formaldehyde, aluminum salts, zinc salts, titanium salts, melamine-formaldehyde which is commercially available under the tradename MADURIT MW from Vianova Resins GmbH located in Mainz, Germany, glyoxals, thiourea-formaldehydes, and commercially available CURESAN from BASF Corp. located in Fluorham Park, N.J., and mixtures thereof), fillers, surfactants, light-stabilizers, preservatives (e.g., anti-oxidants), general stabilizers, and/or the like, and/or mixtures thereof.

The embodiments of the polymer disclosed herein advantageously form an ink receiving layer when reacted with an inorganic particulate substance of a substrate. The ink receiving layer advantageously has enhanced water fastness, humid fastness, colorshift, and bleed, and is relatively simple and cost effective to manufacture.

To further illustrate embodiment(s) of the present disclosure, an example is given herein. It is to be understood that this example is provided for illustrative purposes and is not to be construed as limiting the scope of the disclosed embodiment(s).

EXAMPLE

Synthesis of Polymer, Example 2 (Shown Above):

A 250 mL 3-neck round bottom flask was equipped with a nitrogen inlet, a condenser, and a mechanical stirrer. About 95 g of 2-aminoethyl methacrylate hydrochloride (50% solution from Aldrich), about 2.5 g of methacryloylpropyl trimethoxysilane, about 160 g of deionized water, and about 20 ml of methanol were charged to the flask. The mixture was thoroughly mixed with a vacuum sealed stirrer for about 5 minutes. The solution was purged with nitrogen for about 30 minutes to remove oxygen. The whole flask was immersed in an 80° C. water bath. About 0.5 g of sodium persulfate was added, and the solution was polymerized for three hours. A viscous, clear polymer solution was obtained, with the percent solid being about 18%.

Synthesis of poly(2-aminoethylmethacrylate Hydrochloride Salt) (PAEM):

The synthesis procedure and recipe are the same as Polymer, Example 2, except that methacryloylpropyl trimethoxysilane was not used.

Water Fastness Study

Cab-O-Sil MS-55 was treated with 3% aluminum chlorohydrate (ACH) and 8.46% of Silquest A-1100, and was used for the study (referred to as "MS-55-1"). Three coating formulations were prepared according to Table 1. The first formulation did not contain the polymer disclosed herein, the second formulation contained 2 parts of poly(2-aminoethylmethacrylate), and the third formulation contained 2 parts of Polymer, Example 2.

TABLE 1

Different Coating Formulations

| Coating Formula | MS-55-1 | Poly vinyl alcohol | Boric acid | Glycerol | Polysiloxane Surfactant | Fluoro Surfactant | Polymer | % Solid | Viscosity (cps @ 45 C.) |
|---|---|---|---|---|---|---|---|---|---|
| 1 | 100 | 21 | 2.25 | 1 | 0.5 | 0.05 | None | 17 | 102 |
| 2 | 100 | 21 | 2.25 | 1 | 0.5 | 0.05 | PAEM (2) | 17 | 120 |
| 3 | 100 | 21 | 2.25 | 1 | 0.5 | 0.05 | P-2 (2) | 17 | 118 |

These three coating lacquers were coated on a photobase paper with wire bar to give a coatweight of 30 grams per square meter. An HP 6540 inkjet printer was used to print the test image. The ISO evaporation test and ISO wiping test were used to compare the water resistance of these three inkjet media against water. The results are shown in Table 2. "5" denotes the best water resistance and "1" denotes the worst water resistance.

TABLE 2

Water Evaporation and Water Dripping Tests

| | Water Evaporation Test | Water Dripping Test | Type of Polymer |
|---|---|---|---|
| Formula 1 | 1 | 3 | Comparison |
| Formula 2 | 3 | 3 | Comparison |
| Formula 3 | 5 | 5 | Embodiment of the polymer disclosed herein |

The results of shown in Table 2 indicate that embodiments of the polymer disclosed herein performed better than the comparison polymers in both the water evaporation test and the water wiping test.

While several embodiments have been described in detail, it will be apparent to those skilled in the art that the disclosed embodiments may be modified. Therefore, the foregoing description is to be considered exemplary rather than limiting.

What is claimed is:

1. A method of making an ink recording element, comprising:

forming an ink receiving layer on a substrate, the ink receiving layer comprising a polymer chemically bonded with an inorganic particulate substance, wherein the polymer includes:

at least one first monomer chosen from: aminoethylmethacrylate; aminoethylacrylate; 2-(t-butylamino)ethylmethacrylate; 2-methylaminoethylmethacrylate; 2-(ethylamino)ethylmethacrylate; 2-propylaminoethylmethacrylate; 2-(t-butylamino)ethylacrylamide; aminoethylacrylamide; aminoethylmethacrylamide; methylaminoethylmethacrylate; trimethylaminoethylmethacrylate chloride salt (quat); 2-vinyl-imidazole; (vinylbenzyl)trimethylammonium chloride; (vinylbenzyl)triethylammonium chloride; or diallyldimethylammonium chloride salt;

at least one second monomer chemically bonded with the at least one first monomer, wherein the at least one second monomer is positioned at a non-terminal end of a carbon backbone of the polymer, and wherein the at least one second monomer is represented by the formula:

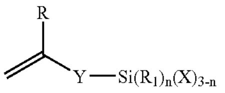

wherein, n is an integer from 0 to 2;

R is a hydrogen, methyl, or ethyl group;

$R_1$ is selected from hydrogen, an organic group containing 1 to 10 carbon atoms, and combinations thereof;

Y is a linking group containing 1 to 15 carbon atoms; and

X is a halogen, hydroxyl, or alkoxy functional group, wherein each of $R_1$ and X is directly attached to the silicon atom.

2. The method as defined in claim 1 wherein chemically bonding the polymer with the inorganic particulate substance is accomplished by reacting the silane group of the at least one second monomer with a hydroxy group at a surface of the inorganic particulate substance.

3. The method as defined in claim 2 wherein the inorganic particulate substance is a metal oxide or a semi-metal oxide.

4. The method as defined in claim 3 wherein the metal oxide or the semi-metal oxide is selected from fumed silica, silica gel, colloidal silica, fumed alumina, boehmite, semi-boehmite, and combinations thereof.

5. The method as defined in claim 4 wherein a surface area of the metal oxide or the semi-metal oxide ranges from about 100 square meters per gram to about 400 square meters per gram.

6. The method as defined in claim 1 wherein providing the polymer is accomplished by polymerizing the at least one first monomer with the at least one second monomer in an aqueous solution, in organic solvents, or in a mixture of water and water miscible organic solvents.

7. The method as defined in claim 1 wherein polymerizing is accomplished via free radical polymerization.

8. An ink recording element, comprising:

a substrate; and an ink receiving layer disposed on the substrate, the ink receiving layer including a polymer chemically bonded with an inorganic particulate substance, wherein the polymer includes:

at least one first monomer chosen from: aminoethylmethacrylate; aminoethylacrylate; 2-(t-butylamino)ethylmethacrylate; 2-methylaminoethylmethacrylate; 2-(ethylamino)ethylmethacrylate; 2-propylaminoethylmethacrylate; 2-(t-butylamino)ethylacrylamide; aminoethylacrylamide; aminoethylmethacrylamide; methylaminoethylmethacrylate; trimethylaminoethylmethacrylate chloride salt (quat); 2-vinyl-imidazole; (vinylbenzyl)trimethylammonium chloride; (vinylbenzyl)triethylammonium chloride; or diallyldimethylammonium chloride salt;

at least one second monomer chemically bonded with the at least one first monomer, wherein the at least one second monomer is positioned at a non-terminal end of a carbon backbone of the polymer, and wherein the at least one second monomer is represented by the formula:

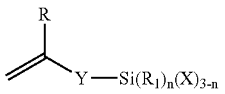

wherein, n is an integer from 0 to 2;

R is a hydrogen, methyl, or ethyl group;

$R_1$ is selected from hydrogen, an organic group containing 1 to 10 carbon atoms, and combinations thereof;

Y is a linking group containing 1 to 15 carbon atoms; and

X is a halogen, hydroxyl, or alkoxy functional group, and wherein each of $R_1$ and X is directly attached to the silicon atom.

9. The ink recording element as defined in claim 8 wherein the inorganic particulate substance is a metal oxide or a semi-metal oxide.

10. The ink recording element as defined in claim 9 wherein the semi-metal oxide is selected from: fumed silica having a surface area ranging from about 100 square meters per gram to about 400 square meters per gram; fumed alumina having a surface area ranging from about 100 square meters per gram to about 400 square meters per gram; and combinations thereof.

11. The ink recording element as defined in claim 8 wherein the substrate is selected from a single or double sided resin coated paper, a cast coated paper, a calendered coated paper, and a polymer film.

12. The ink recording element as defined in claim 11 wherein the resin coated paper is selected from polyethylene extruded photo paper and polypropylene extruded photo paper.

13. The ink recording element as defined in claim 8 wherein the polymer further includes at least one third monomer chemically bonded with the at least one first monomer and the at least one second monomer, and wherein the at least one first monomer is present in an amount ranging from about 10 wt % to about 95 wt %, wherein the at least one second monomer is present in an amount ranging from about 0.1 wt % to about 20 wt %, and wherein the at least one third monomer is present in an amount ranging from about 0 wt % to about 90 wt %.

* * * * *

UNITED STATES PATENT AND TRADEMARK OFFICE

CERTIFICATE OF CORRECTION

PATENT NO. : 7,923,117 B2
APPLICATION NO. : 11/626906
DATED : April 12, 2011
INVENTOR(S) : Tienteh Chen It is certified that error appears in the above-identified patent and that said Letters Patent is hereby corrected as shown below:

On the Title page, in item (75), Inventor, in column 1, line 1, delete "Tienteh Chon," and insert -- Tienteh Chen, --, therefor.

Signed and Sealed this
Sixth Day of September, 2011

David J. Kappos
*Director of the United States Patent and Trademark Office*